United States Patent [19]

Shibuya et al.

[11] Patent Number: 5,636,082
[45] Date of Patent: Jun. 3, 1997

[54] ROTATING DISK STORAGE DEVICE WITH COOLING AIR FLOW CONTROL

[75] Inventors: Takeshi Shibuya, Ibaraki-ken; Naoki Maeda; Tsuyoshi Takahashi, both of Odawara; Kouki Uefune, Minami-ashigara, all of Japan

[73] Assignee: Hitachi, Ltd., Tokyo, Japan

[21] Appl. No.: 434,293

[22] Filed: May 3, 1995

Related U.S. Application Data

[63] Continuation of Ser. No. 124,062, Sep. 21, 1993, Pat. No. 5,517,372.

[30] Foreign Application Priority Data

Sep. 25, 1992 [JP] Japan .................................. 4-256645

[51] Int. Cl.$^6$ ............................................. G11B 33/14
[52] U.S. Cl. ........................................................ 360/97.02
[58] Field of Search ............................................ 360/97.02

[56] References Cited

FOREIGN PATENT DOCUMENTS 61-196494  8/1986  Japan ........................... 360/97.02

Primary Examiner—A. J. Heinz
Attorney, Agent, or Firm—Antonelli, Terry, Stout & Kraus, LLP

[57] ABSTRACT

A storage device includes a partition wall dividing an interior of a casing into a disk chamber and a drive chamber. Recording disks are rotatably disposed in the disk chamber. Arms, each supporting a read/write head at a distal end portion thereof are capable of exteding into the respective spaces between the recording disks through an opening of the partition wall. An actuator is mounted within the drive chamber for linearly reciprocating the arms to cause the heads to skim across recording surfaces of the recording disks. An interrupting surface is formed on a portion of the partition wall at a downstream side of the arm with respect to an air flow due to the rotation of the recording disks, for interrupting the air flow to convert a dynamic pressure of the air flow into a static pressure thereof. With this arrangement, the air is prevented from flowing back from the drive chamber into the disk chamber.

1 Claim, 9 Drawing Sheets

ROTATING DISK STORAGE DEVICE WITH COOLING AIR FLOW CONTROL

This application is a Continuation of application Ser. No. 08/124,062, filed Sep. 21, 1993 now U.S. Pat No. 5,517,372.

FIELD OF THE INVENTION AND RELATED ART STATEMENT

This invention relates to a data storage disk device such, for example, as a magnetic disk device.

In a data storage disk device such as a magnetic disk device, there is used a flying head slider which flies or skims over a disk surface with a gap of 0.1 μm–0.2 μm therein between, and is supported by an air bearing. Therefore, in order to ensure sufficient reliability of the device, it is necessary to provide a very clean environment in the device.

In a magnetic disk device provided with a linear actuator for driving an arm carrying a head slider, complicated drive mechanisms, such as a guide portion and a bearing portion for the actuator, are exposed within the device, and therefore it is necessary to provide means for dealing with dust accidentally produced from such drive mechanism. Also, in order to prevent an off-track driving of the arm due to thermal deformation of component parts within the device, it is necessary to circulate the air in the device so as to cool heat-generating parts such as an actuator.

Japanese Patent Unexamined Publication No. 61-196494 and U.S. Pat. Nos. 4,780,776 and 5,031,059 disclose a construction in which a casing is divided by a partition wall into a disk housing portion for receiving disks therein, and a drive mechanism portion receiving an actuator therein. According to this reference, the disk housing portion is isolated from the drive mechanism portion, and therefore the disks are protected against an accidental contamination from the drive mechanism portion. A through opening through which an arm passes is formed in the partition wall, and an air stream flows from the disk housing portion to the drive mechanism portion through the through opening to cool component parts within the device.

In such a device, it is important that the air, once passed the through opening, should be prevented from flowing back from the drive mechanism portion into the disk housing portion. By doing so, efficient air flow circulation is produced, and the disk housing portion is kept very clean.

Therefore, in these techniques, in order to prevent the reverse air flow through the through opening, it has been proposed to provide a pressure-increasing means in the disk housing portion, with the means extending radially inwardly between the disks to increase the pressure within the disk housing portion, so as to strengthen the air stream flowing between the disks in a radially outward direction from the center portion of the disks.

The reverse air flow through the through opening is classified mainly into following three kinds:

(1) A reverse air flow at a downstream side of the arm;
(2) A reverse air flow between each of opposite end disks (in a vertical direction between a stack of disks) and a disk housing wall; and
(3) A reverse flow due to the mixing of streams at an upstream side of the arm.

When the arm is inserted inward deeply into the space between the disks, the pressure in this space at the downstream side of the arm decreases, so that the reverse air flow (1) is produced. One proposal to prevent the reverse air flow (1) is to provide spoilers at the downstream side of the arm to sufficiently increase the pressure to compensate for the pressure decrease at the downstream side of the arm.

However, in order to completely prevent the reverse airflow (1) with such a method, spoilers sufficiently larger in size than the arm are needed, as shown in FIGS. 1 and 2 of Japanese Patent Unexamined Publication No. 61-196494. Therefore, in this case, increased power consumption due to an air flow loss caused by the spoilers presents another serious problem.

Furthermore, in a stagnation region at the downstream side of the arm, there is created a pressure gradient in which the pressure is higher at the outer peripheral portion of the disk than at the inner peripheral portion because of differences of the peripheral speed in the radial direction of the disk. Therefore, if the spoiler, provided between the disks at the downstream side of the arm, is not of a sufficient size, the air is drawn from the outside of the disks into the space between the disks at the downstream side of the arm. Because of this suction phenomenon, there is encountered a problem that the air which may have been contaminated is drawn from the outside of the disk housing portion to the vicinity of the head slider.

The air reverse flow (2) is attributable to the fact that the energy of the air stream in the flow passage between each of the opposite end disks and the disk housing wall is extremely smaller than the energy of the air stream between the disks. In order to prevent such a reverse air flow, it is effective to sufficiently increase the pressure at the opposite end portions of the disk housing wall in the direction of the axis thereof. Therefore, in the construction disclosed in Japanese Patent Unexamined Publication No. 63-239666, a spoiler is provided between each of the opposite end disks and the disk housing wall.

With such a construction, however, if the interval between each of the opposite end disks and the disk housing wall is so small that the spoiler cannot be easily installed, the manufacturing cost is increased.

As shown in FIG. 4 of Japanese Patent Unexamined Publication No. 63-239666, the reverse air flow (3) is a reverse air flow of dust which is produced through a plane of mixing of air streams developing at that portion of the through opening disposed upstream of the arm, when the arm is hardly inserted into the space between the disks. In order to prevent such a reverse air flow, it is necessary to provide means for directing the stream mixing plane toward the drive mechanism portion.

SUMMARY OF THE INVENTION

It is an object of the present invention to provide a rotary disk-type storage device in which the above-mentioned reverse air flows (1) to (3) are prevented without increasing an air flow loss, component parts within the device can be cooled quite efficiently, the interior of a disk housing has a high cleanability, and a high level of reliability of the device is achieved.

According to the present invention, there is provided a storage device comprising: a casing; a partition wall dividing an interior of the casing into a disk chamber and a drive chamber; a recording disk disposed in the disk chamber; means for rotating the recording disk; an arm supporting a read/write head, the arm being adapted to extend through the partition wall; means disposed in the drive chamber for linearly moving the arm to cause the head to skim over a recording surface of the recording disk in a radical direction; and means disposed at a downstream side of the arm with respect to an air flow due to the rotation of the recording disk, for interrupting the air flow to convert a dynamic pressure of the air flow into a static pressure thereof.

DETAILED DESCRIPTION OF PREFERRED EMBODIMENTS

Figure 1:
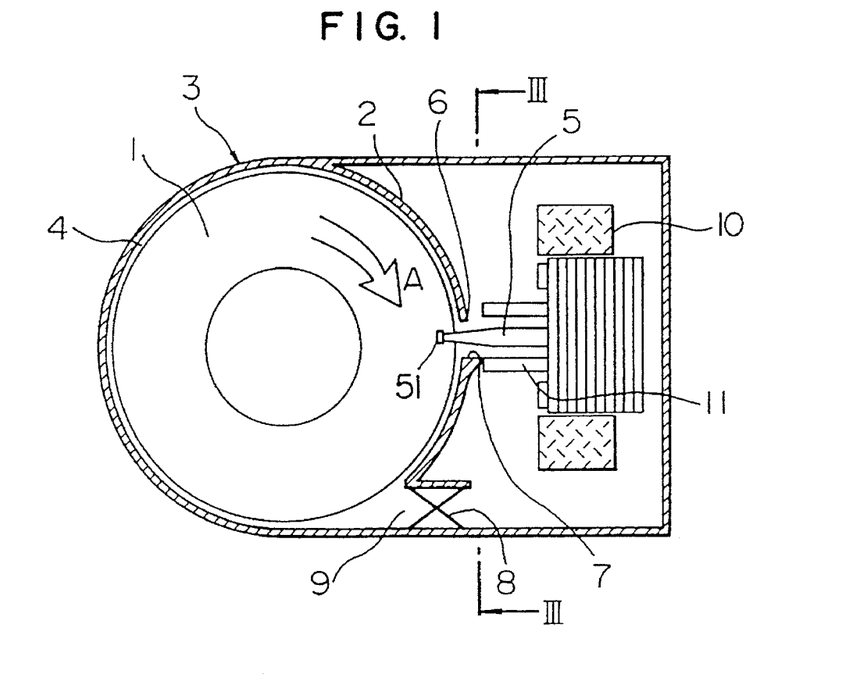
FIG. 1 is a cross-sectional view of a magnetic disk device provided in accordance with one embodiment of the present invention.

A preferred embodiment of a magnetic disk device of the present invention comprises disks 1, as shown in FIG. 1. The disks 1 are rotatable in a direction of arrow A in FIG. 1. A flying head 51 for writing and reading data relative to the disk 1 is provided on a distal end of each arm 5. In this magnetic disk device, a casing 3 of a sealed construction is divided by a partition wall 2 into a disk housing portion (disk chamber) 4 and a drive mechanism portion (drive chamber). The disks 1 are received within the disk housing portion 4 whereas an actuator 10 for driving the arms 5 is housed in the drive mechanism portion. The partition wall 2 has a through opening 6 through which the linearly-movable arms 5 extend, and also has an opening 9 in which a filter 8 is provided. The partition wall 2 has a surface 7 which is disposed adjacent to the downstream side of the arm 5, and serves to interrupt an air stream in a direction of the circumference of the disk 1. The magnetic disk device is used in a vertically-disposed condition, that is, in such a position that a direction of the gravity is on a plane of rotation of the disk 1, and is perpendicular with a direction of the movement of the arm 5.

Figure 2:
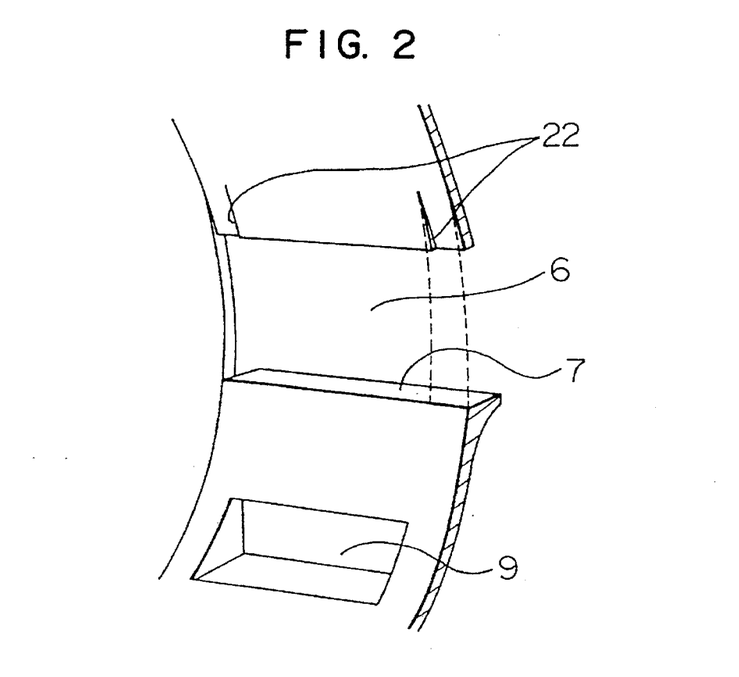
FIG. 2 is a perspective view showing a through opening provided in the device of FIG. 1.

A portion of the partition wall 2 disposed at the upstream side of the arm 5 is spread or diffused outwardly so that the air flow or stream between the disks 1 can be smoothly directed toward the interrupting surface 7. As shown in FIG. 2, the partition wall 2 is spread or diffused toward the actuator 10 at its opposite axial end portions 22 (in the direction of stack of the disks 1) in a slightly larger amount than at a portion of the partition wall 2 intervening between the opposite axial end portions 22.

Figure 3:
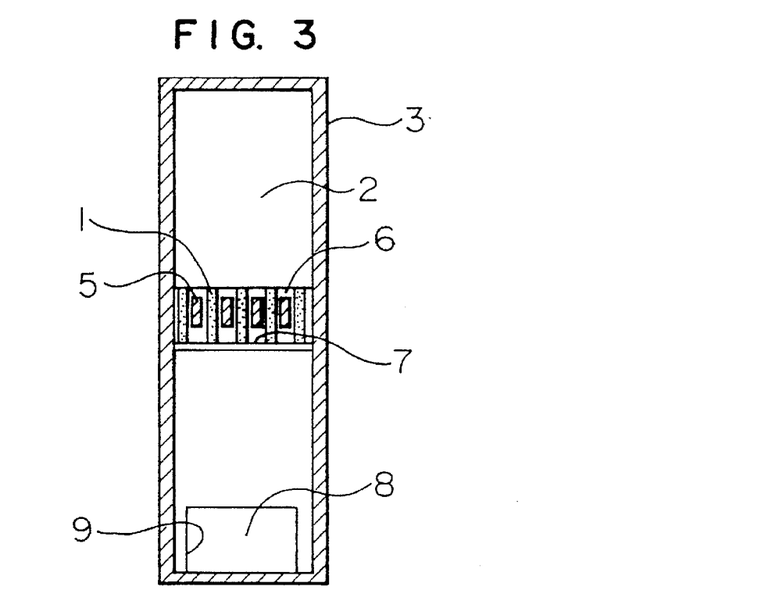
FIG. 3 is a cross-sectional view taken along the line III—III of FIG. 1.
Figure 4:
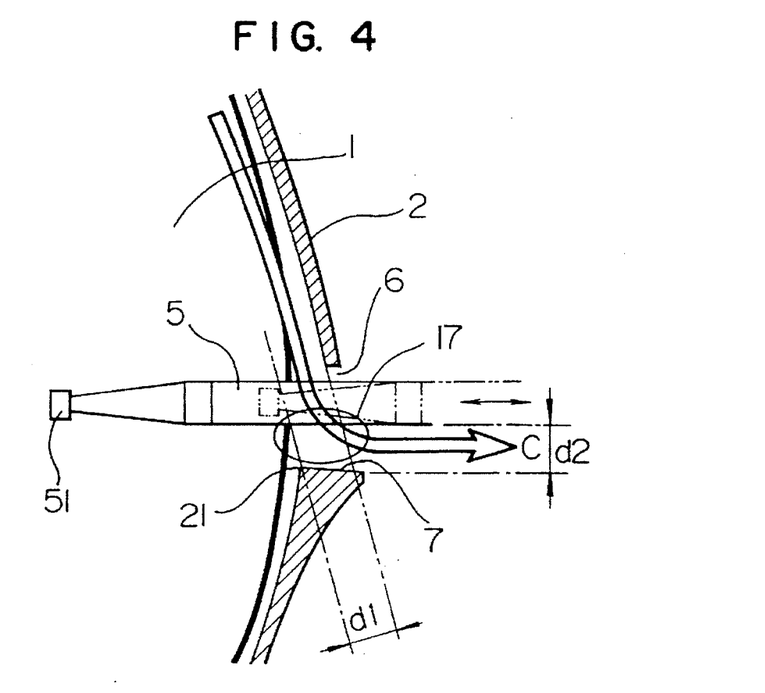
FIG. 4 is a view illustrating air flows near an arm in the device of FIG. 1.

The interrupting surface 7 extends over the entire length of the through opening 6 in the direction of stack of the disks 1, as shown in FIG. 3. Also, the interrupting surface 7 extends radially outwardly across a tangential plane (indicated by a two dot chain line) of the partition wall 2 passing through the upstream-side end of the through opening 6, and extends generally parallel to the arm 5, as shown in FIG. 4. A distance $d_2$ between the interrupting surface 7 and the arm 5 is slightly smaller than a distance $d_1$ between the above tangential plane and an open end 21 of the partition wall 2. Here, the term "tangential plane" means a tangential plane substantially defining the direction of flow of the air due to the rotation of the disks, and does not mean a tangential plane as used for a chamfered surface.

Incidentally, in order to facilitate an integral casting of the casing 3, a draft of about 5° with respect to the arm 5 is provided on the interrupting surface 7, as shown in FIG. 4, and then the interrupting surface 7 is not exactly parallel to the arm 5. Whether or not the draft of such a degree is provided is not significant.

Next, the operation of the above construction will now be described.

When the disks 1 rotate in the direction of arrow A, an air stream is produced in the disk housing portion 4 and flows into the drive mechanism portion via the through opening 6. The air stream thus flowed into the drive mechanism portion cools heat-generating parts of the actuator 10, and then is filtered by the filter 8, and is returned to the disk housing portion 4 via the opening 9. Thus, the air circulates through the casing 3.

Here, the air stream in the disk housing portion 4 is restricted in its flow direction so as to flow along the partition wall 2, and flows along a flow passage defined by the tangential plane and a plane (indicated by a one dot chain line in FIG. 4) passing through the open end 21 of the partition wall 2 and parallel to the tangential plane. Then, this air stream is interrupted by the interrupting surface 7 to change its direction as indicated by arrow C, and at the same time dynamic pressure of this air stream is converted into a static pressure to form a high-pressure area 17, and this air stream flows into the drive mechanism portion through the through opening 6. The pressure gradient at downstream side of the arm 5 from the drive mechanism portion toward the disk housing portion 4, is locally interrupted by the high-pressure area (pressure peak) 17, thereby preventing the air from flowing back from the drive mechanism portion to the disk housing portion 4.

In this embodiment, the opposite end portions 22 of the partition wall 2 are further spread as shown in FIG. 2, so that the flow of the air from the disk housing portion 4 to the drive mechanism portion is promoted at these end portions 22. With this construction, the reverse flow produced at the opposite end disks as described in Japanese Patent Unexamined Publication No. 63-239666 is prevented. However, even if the opposite end portions 22 are not further spread, the reverse air flow downstream of the arm, which gives the largest influence, is prevented.

Figure 5:
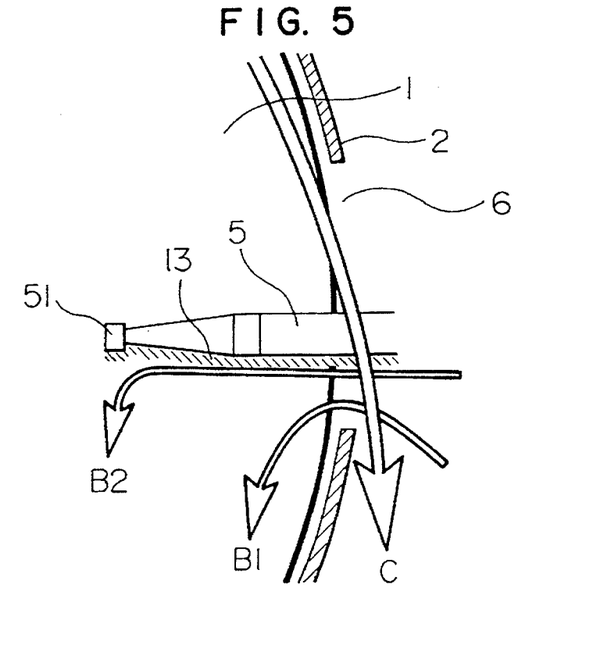
FIG. 5 is a view illustrating air flows near an arm in a conventional device.

On the other hand, without the interrupting surface 7 as is the case with the construction disclosed in U.S. Pat. No. 4,780,776, a reverse air flow $B_1$ drawn from the drive mechanism portion, due to a pressure drop downstream of the arm 5, as well as a reverse air flow $B_2$ drawn along the arm 5 would be formed as shown in FIG. 5. The reverse flow $B_2$ is produced by a pressure gradient in a stagnation area 13 along the arm 5, which is caused by a difference of the peripheral speeds in the radial direction of each disk. Both of the reverse flows $B_1$ and $B_2$ are, of course, harmful, and besides there is encountered a disadvantage that the reverse flow $B_2$ carries dust from the drive mechanism portion as far as a position near the head slider 51.

Figure 6:
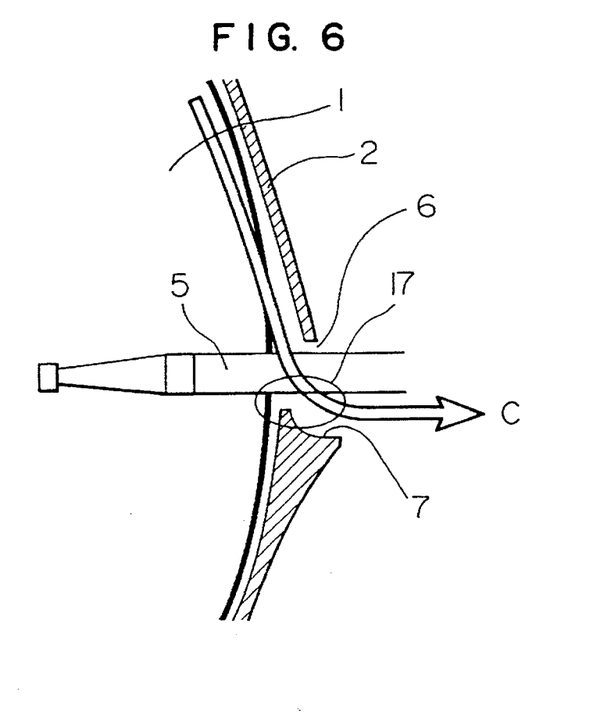
FIGS. 6 to 11 are fragmentary, cross-sectional views showing modified flow interrupting means, respectively.

FIG. 6 shows a modified embodiment in which an interrupting surface 7 has a curved configuration. In this case, an outflow end portion of the interrupting surface 7 is made generally parallel to the arm 5 so that an outflow C of air from the space between the disks 1 can flow along the arm 5.

Figure 7:
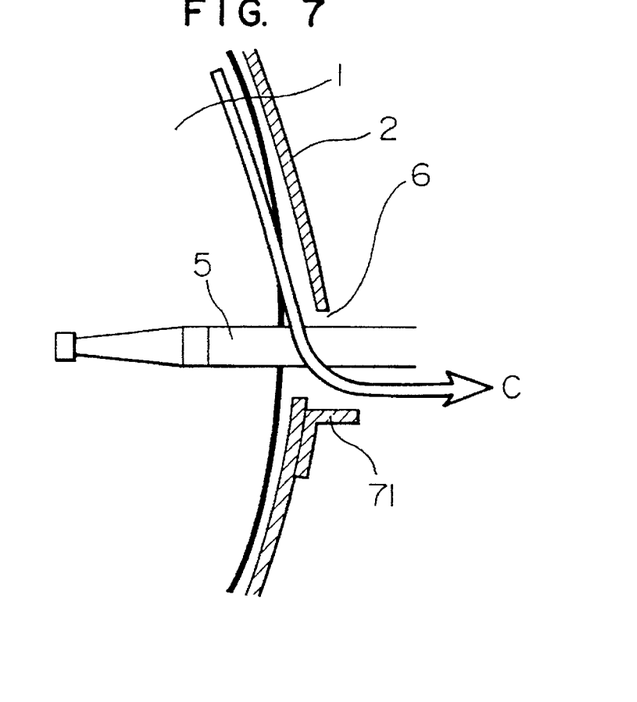

FIG. 7 shows another modified embodiment in which a separate interrupting member 71 is combined with a partition wall 2. In this case, the interrupting member 71 of a suitable design can be selected in accordance with various conditions.

Figure 8:
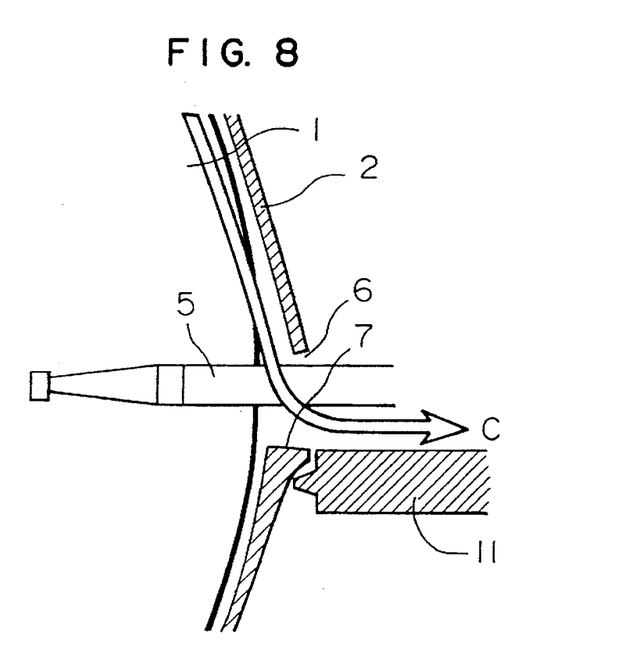

When a sufficient length of an interrupting surface 7 in a radial direction of the disk cannot be obtained, a part of an actuator mounting means 11 can be used as a part of the interrupting surface, so that the interrupting surface can be substantially extended, as shown in FIG. 8.

Figure 9:
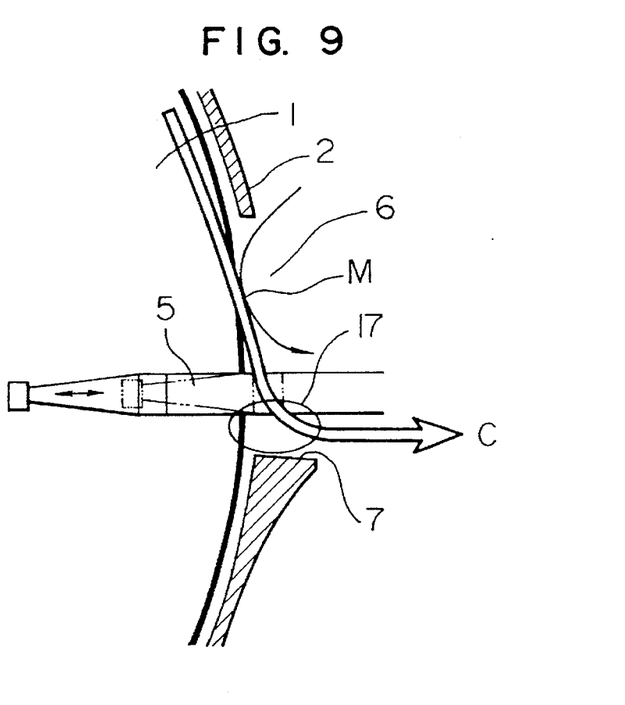
Figure 10:
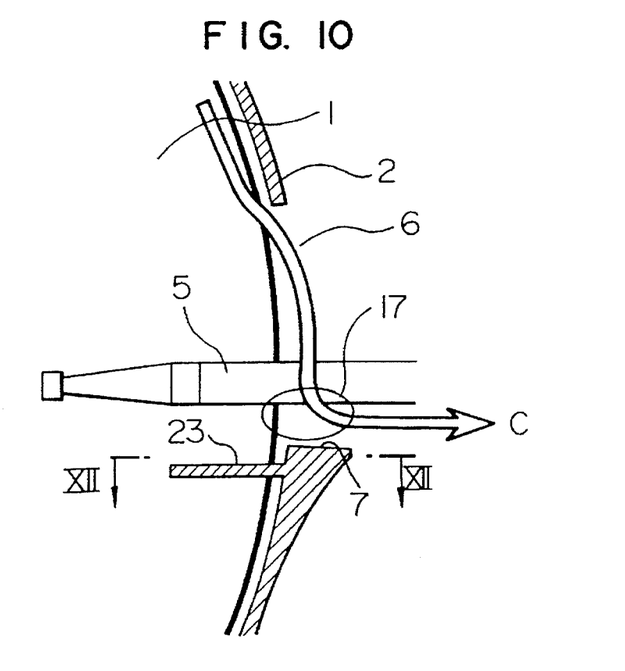
Figure 11:
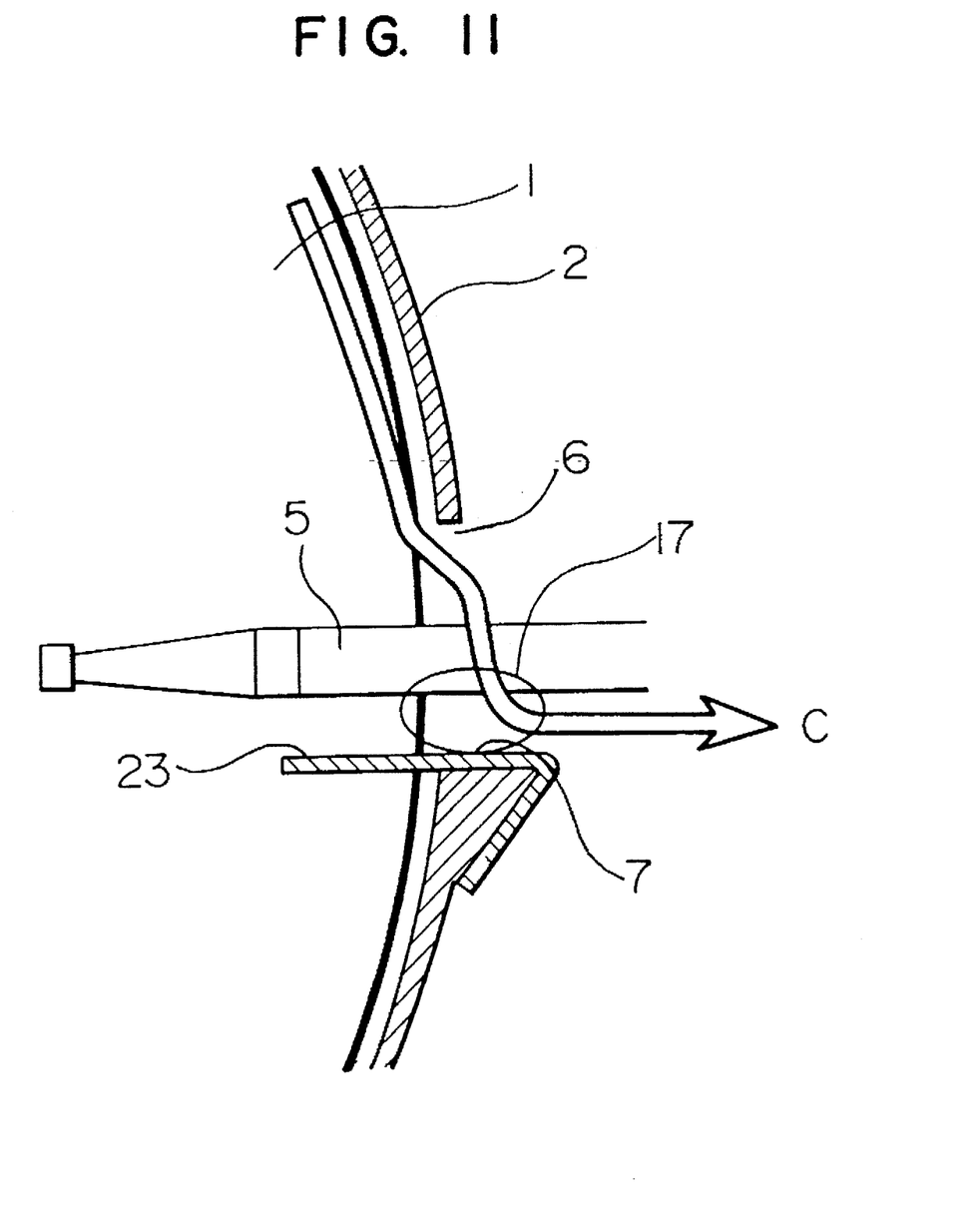

In further modified embodiments in FIGS. 9 and 10, respectively, a portion or an area of a through opening 6 disposed on an upstream side of the arm 5 is larger for an assembly purposes. In this case, even if that portion of a partition wall 2 disposed at the upstream side of the through opening 6 is hardly spread or diffused outwardly, an air stream or flow can be directed toward an interrupting surface 7, and a reverse air flow from the downstream side of the arm 5 is prevented. In this case, the problem is a reverse air flow due to the mixing of streams M at the portion of the through opening 6 disposed at the upstream side of the arm 5, as shown in FIG. 9. However, with the type of disk device in which the arms 5 are always inserted into the disk housing portion 4 as shown in FIG. 9, the pressure within the disk housing portion 4 is increased by the arms 5, and at the upstream side of the arm 5, the stream mixing plane is shifted toward the drive mechanism portion, thereby preventing the reverse flow. When spoilers 23 are extended radially inwardly from a partition wall 2 as shown in FIG. 10, they increase the pressure within the disk housing portion 4, so that the stream mixing plane is more positively shifted toward the drive mechanism portion, and the overall reverse air flow is effectively prevented. In this case, the purpose of the spoiler 23 is not to fully increase the pressure downstream of the arm 5, but to shift the stream mixing plane toward the drive mechanism portion, and then it has been confirmed through experiments that a sufficient amount of insertion of the spoiler 23 into the space between the disks is about one-tenth of the radius of the disk. Incidentally, as shown in FIG. 11, if a separate member of an L-shaped cross-section is mounted on a partition wall 2 to serve as a spoiler 23 and as an interrupting surface 7, the same function as the above can be obtained by an easy assembly operation.

Figure 12A:
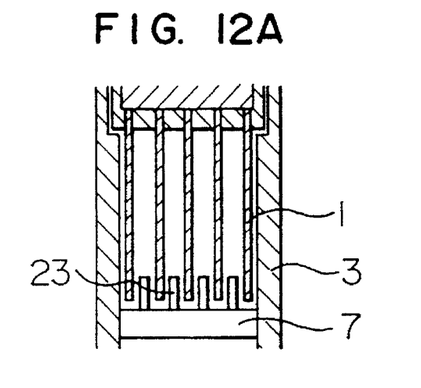
FIGS. 12A to 12E are cross-sectional views taken along the lines of XII—XII of FIG. 10, showing modified forms of the invention in which spoilers are provided upstream of an arm.
Figure 12B:
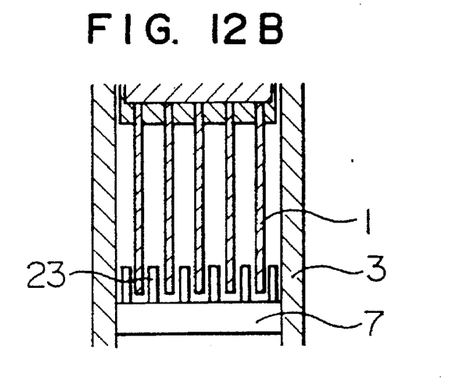
Figure 12C:
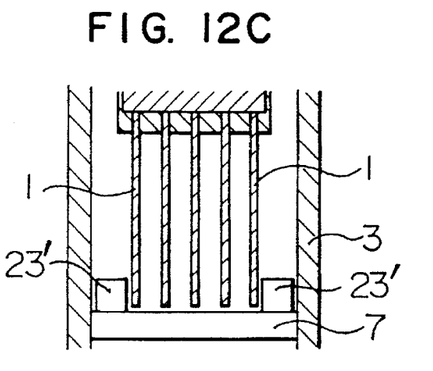
Figure 12D:
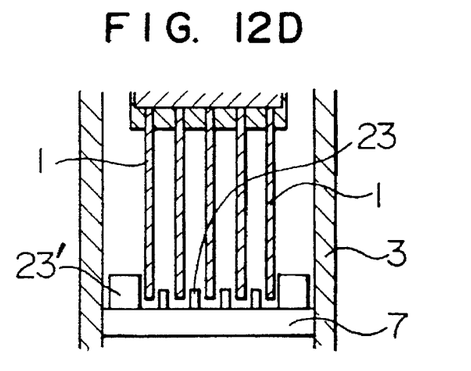

Usually, the spoilers 23 have the same configuration, as shown in FIGS. 12A and 12B. However, particularly when the spaces between the end disk 1 and a casing 3 are large, and a reverse air flow at these portions may occurr, spoilers 23' longer than the other spoilers 23 are provided in the respective spaces between the end disk 1 and the casing 3, as shown in FIGS. 12C, 12D and 12E.

Figure 12E:
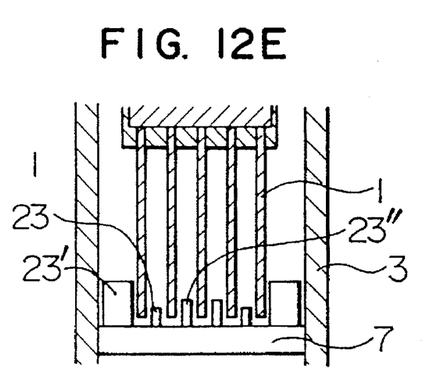

With respect to the arrangement shown in FIG. 12E, in order to deal with the temperature rise between the disks due to air flow loss, the central spoilers 23" are also made longer.

Figure 13:
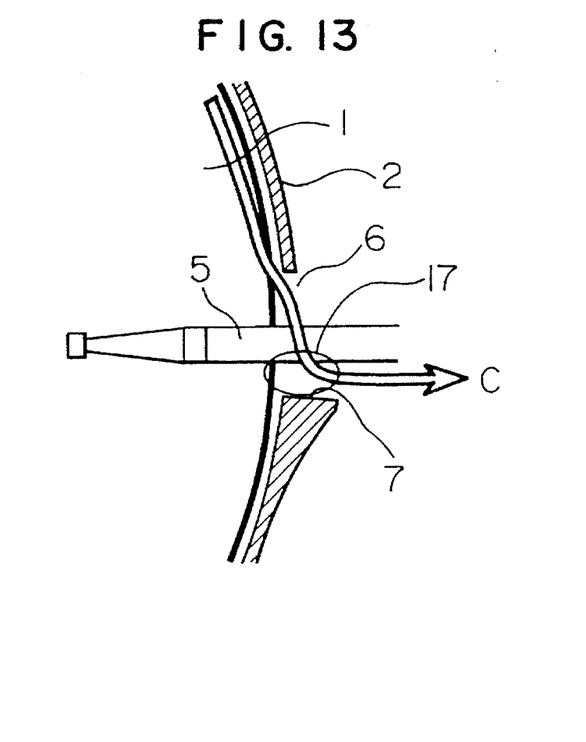
FIG. 13 is a cross-sectional view of a modified flow interrupting means.

In a further modified embodiment shown in FIG. 13, no spoiler is provided, and a partition wall is not spread radially outwardly. However, when each arm 5 is always disposed between disks 1 as in a disk device in which only an inner peripheral portion of the disk is used as a recording surface, the arm 5 itself shifts a high velocity air stream flowing along the outer periphery of the disk 1 toward a drive mechanism portion. Therefore, with the construction shown in FIG. 13, satisfactory effects can be achieved.

Figure 14:
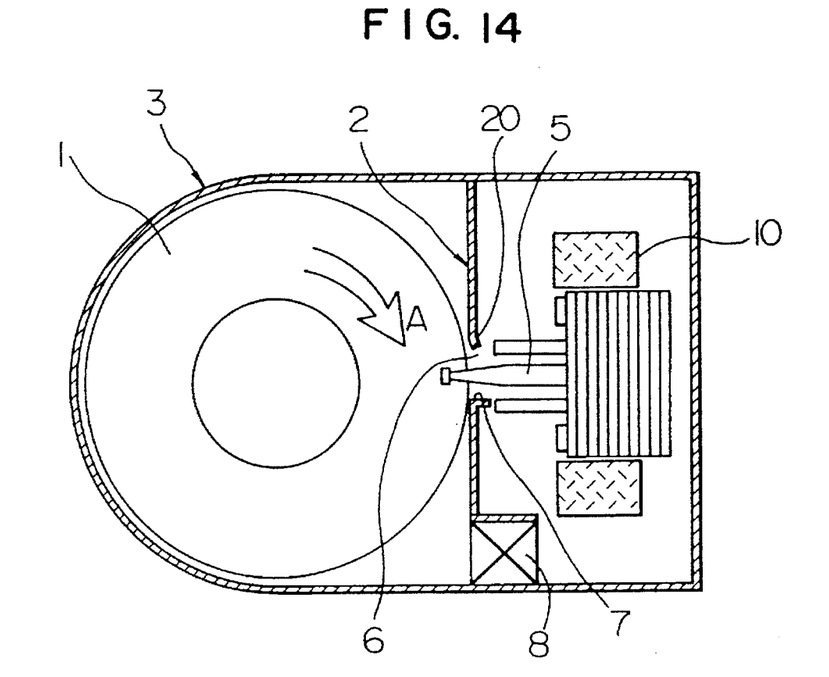
FIGS. 14 to 16 are cross-sectional views of further modified magnetic disk devices according to other respective embodiments of the present invention.

In a further modified embodiment shown in FIG. 14, a relatively flat partition wall 2 is used. In this case, a portion 20 of the partition wall 2 at an upstream side of a through opening 6 is slightly bent so that an air stream can be directed toward an interrupting surface 7. In this case, the partition wall 2 is of a simple construction, and therefore if the partition wall 2 is separate from a casing 3, the manufacturing cost is reduced.

Figure 15:
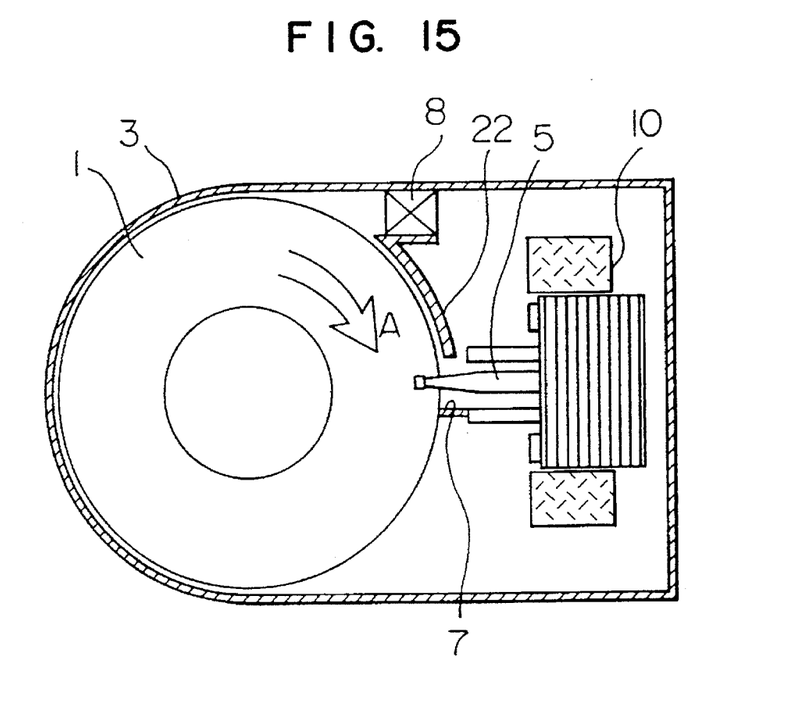
Figure 16:
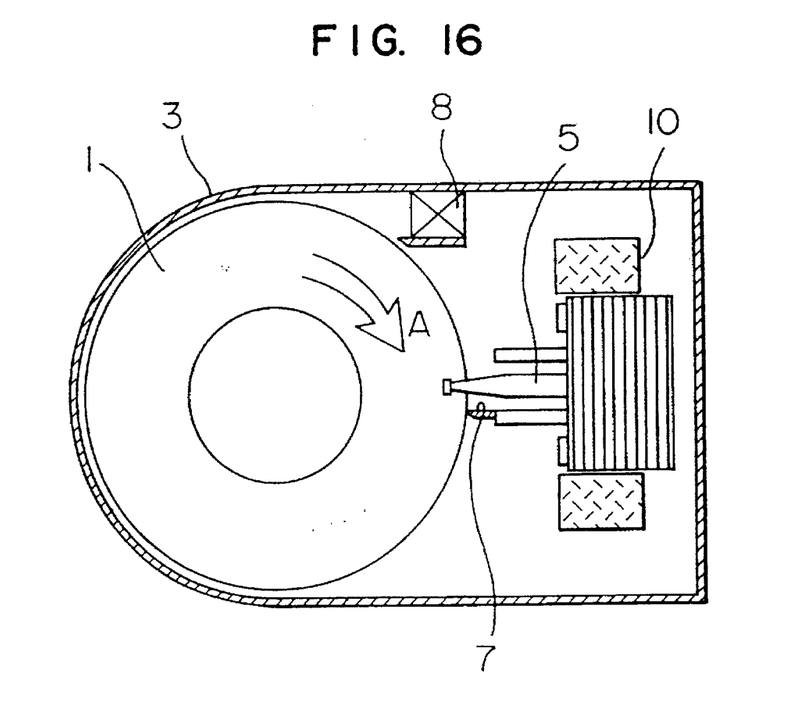

In view of the nature of the present invention, the disks 1 are preferably isolated by the partition wall 2 as described for the above embodiments, but, even where the disks 1 are not isolated from an actuator 10 as shown in FIGS. 15 and 16, such a construction is still sufficiently effective with respect to the cooling of the actuator 10. In this case, particularly when an air stream guide 22 is provided as shown in FIG. 15, the effect of an interrupting surface 7 becomes more positive.

As described above, in the present invention, the efficiency of cooling the component parts within the disk device can be enhanced without increasing an air flow loss (a power consumption), and the intrusion of dust into the disk housing portion can be prevented.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A rotating disk storage device, comprising:

a casing;

a partition wall dividing an interior of said casing into a disk housing chamber and a drive chamber;

a recording disk disposed in said disk housing chamber;

means for rotating said recording disk;

an arm supporting a read/write head, said arm being adapted to extend into said disk housing chamber through an opening of said partition wall;

means disposed in said drive chamber for linearly moving said arm to cause said head to skim across a recording surface of said recording disk, said opening dividing said partition wall into upstream and downstream wall portions, said upstream and downstream wall portions each having a front surface facing said disk in said disk chamber, said upstream wall portion ending at said opening at a first edge area of said front surface which is adjacent to said opening and spaced a first radial distance from the periphery of said disk, said downstream wall portion beginning at a second edge area adjacent to a downstream edge of said opening, said second edge area being spaced a second radial distance from the periphery of said disk;

means for shifting an air flow which is caused by a rotation of said recording disk; and interrupting means, including a member having a surface extending from said downstream edge of said opening of said partition wall in a direction toward said drive chamber, for interrupting an air flow to convert a dynamic pressure of said air flow into a static pressure adjacent said surface, wherein said shifting means includes opposite end portions of said partition wall in a stacking direction of said recording disks, radial gaps between said end portions and the outer peripheries of said recording disk being larger than that between an intermediate portion of said partition wall and the outer peripheries of said recording disk.

* * * * *